United States Patent [19]

Ise

[11] 4,340,234
[45] Jul. 20, 1982

[54] FLOW REGULATING VALVE AND FLUID FEEDING APPARATUS USING SAME

[75] Inventor: Yoji Ise, Tokyo, Japan

[73] Assignee: Myotoku Ltd., Tokyo, Japan

[21] Appl. No.: 144,879

[22] Filed: Apr. 29, 1980

[30] Foreign Application Priority Data

May 1, 1979 [JP] Japan .................. 54-53644

[51] Int. Cl.³ .................. B23B 31/30; F16K 31/122
[52] U.S. Cl. .................. 279/3; 137/513.3;
137/614.2; 138/46; 144/278 A; 248/362;
248/363; 251/51; 269/21; 294/64 R; 294/65
[58] Field of Search .............. 137/513.3, 599; 138/46;
251/25, 47, 44, 29, 121, 126, 117; 269/21;
279/3; 144/278 A; 248/362, 363; 294/64 R, 65

[56] References Cited

U.S. PATENT DOCUMENTS

| | | | |
|---|---|---|---|
| 1,107,911 | 8/1914 | Darrow | 251/25 |
| 2,634,947 | 4/1953 | Gardner | 137/513.3 |
| 3,395,725 | 8/1968 | Roach | 137/513.3 |
| 3,540,471 | 11/1970 | Churchill | 137/599 |
| 3,603,344 | 9/1971 | Stompfli | 137/599 |
| 3,841,354 | 10/1974 | McDonnell | 251/126 |
| 3,862,738 | 1/1975 | Stumpmeier | 251/44 |
| 3,884,061 | 5/1975 | Westby | 269/21 |
| 3,999,795 | 12/1976 | Barker | 294/64 R |
| 4,149,565 | 4/1979 | Jennings et al. | 251/44 |
| 4,190,240 | 2/1980 | Peterson | 269/21 |

FOREIGN PATENT DOCUMENTS 1147450 4/1963 Fed. Rep. of Germany ...... 251/126

Primary Examiner—George L. Walton
Attorney, Agent, or Firm—Robert E. Burns; Emmanuel J. Lobato; Bruce L. Adams

[57] ABSTRACT

A flow regulating valve comprising a cylinder and a valve rod telescopically fitted within said cylinder, and a flow passage of small sectional area being formed therebetween so as to control flow of the fluid by adjusting depth of the fitting of the valve rod within the cylinder.

The valve is capable of fine and accurate adjustment of the flow rate over a wider range than in the conventional needle valve regulator. A flow regulating valve capable of controlling flow of one direction and permit rapid flow of the opposite direction is also provided by using a check valve together.

Further, a fluid feeding apparatus which is capable of feeding the fluid for a predetermined time interval is provided, by using such flow regulating valve, and a fast acting vacuum chuck device is provided by using such a fluid feeding apparatus.

6 Claims, 4 Drawing Figures

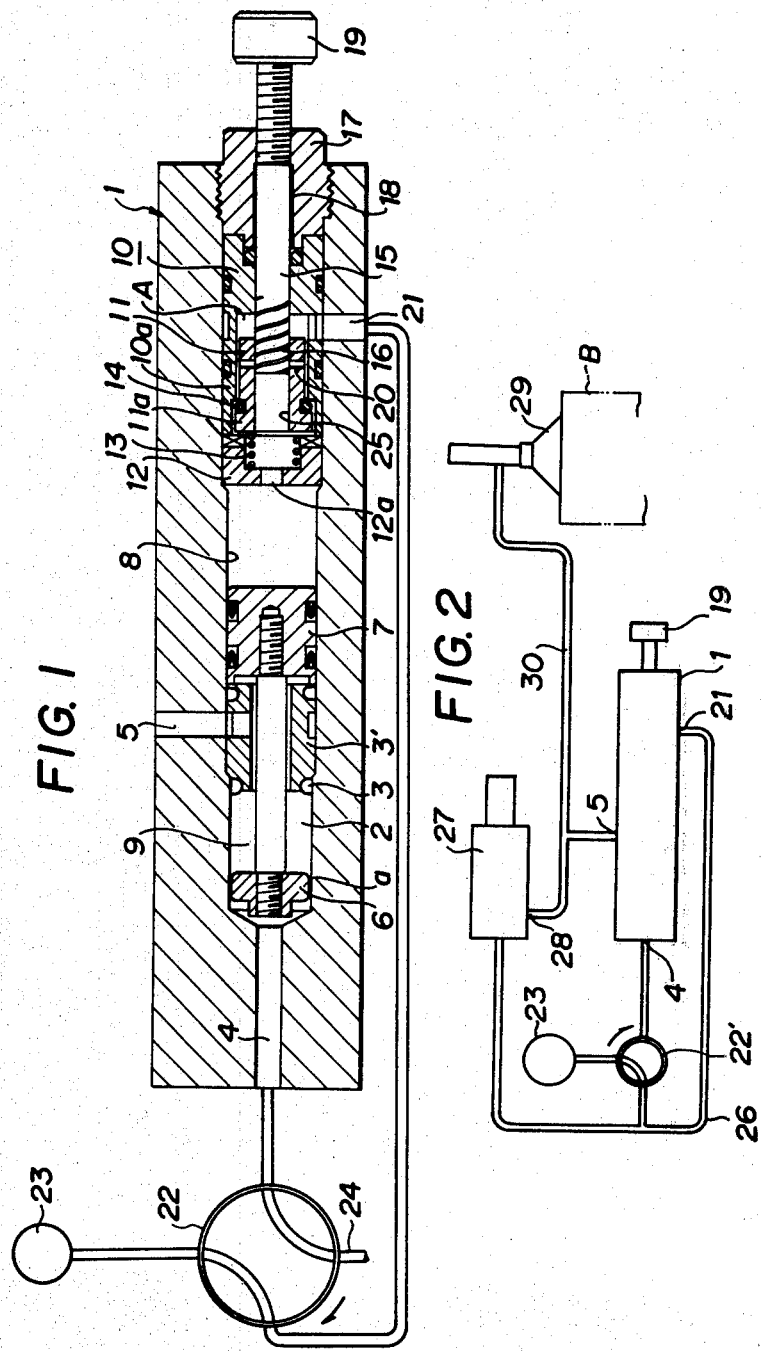

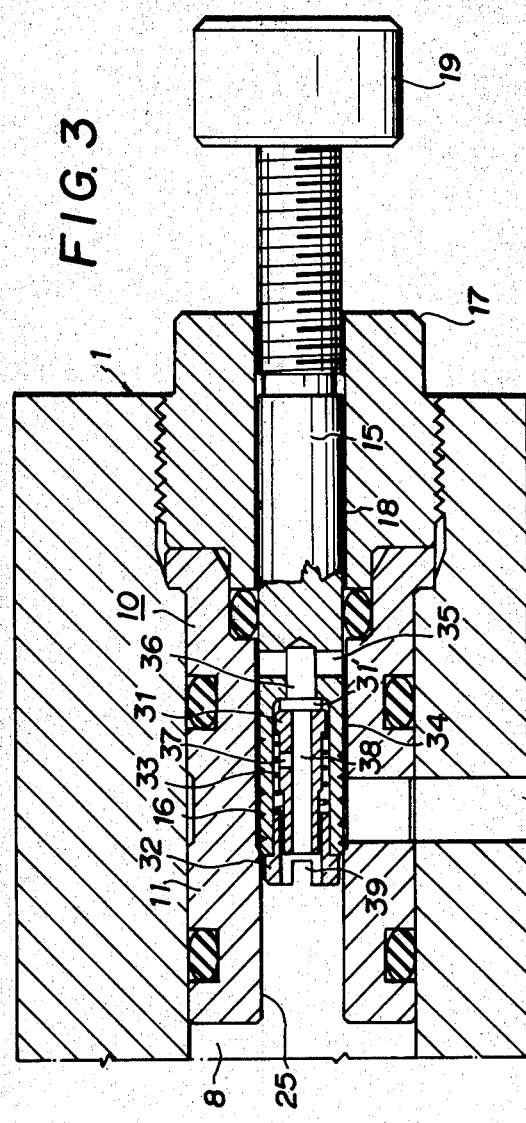
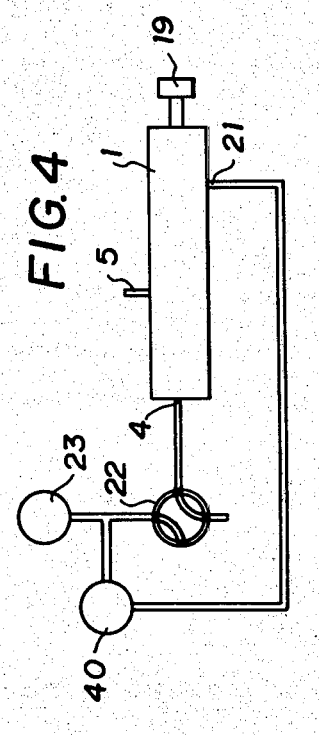
FIG. 3
FIG. 4

FLOW REGULATING VALVE AND FLUID FEEDING APPARATUS USING SAME

BACKGROUND OF THE INVENTION

This invention relates to flow regulating valves and apparatuses using such flow regulating valves. In the conventional needle valve regulators, flow of the fluid can be adjusted only by adjusting the gap between the needle and the conically formed valve seat, so that the fine and accurate adjustment is very difficult with such valves, and this kind of valve is not suitable especially for regulating speed of the piston of fluid driven machines and devices, because the flow rate of the fluid is limited appreciably by the small bore size of the conical valve seat.

Accordingly, one object of the present invention is to provide flow regulating valves, in which a fine and accurate adjustment of the flow rate is attainable over a wide range with a comparatively simple construction. Another object of the present invention is to provide flow regulating valves capable of controlling the flow of one direction and permit rapid flow of the opposite direction by using check valves together. Such flow regulating valves are usable for operating pistons of fluid driven machines and devices. Further object of the invention is to provide a fluid feeding apparatus which will feed the fluid for a predetermined time interval, using such flow regulating valves. Such apparatus may be used, for instance, for releasing a vacuum chuck rapidly, as well as for cleaning articles automatically, etc.

SUMMARY OF THE INVENTION

A flow regulating valve of the present invention comprises a cylinder and a valve rod fitted telescopically within said cylinder, and a flow passage of small sectional area is formed therebetween so as to control flow of the fluid by adjusting the depth of the fitting of said valve rod within said cylinder. Thus a fine and accurate adjustment of the flow can be attained over a wider range than in the conventional needle valve regulator. Moreover, the construction of the regulator of the present invention is comparatively simple and very easy to manufacture. In a preferred embodiment of the present invention, said flow passage is formed by providing a helical groove or grooves on said cylinder or valve rod.

A flow regulating valve capable of controlling the flow of one direction and permit rapid flow of the opposite direction, further comprises a check valve provided on said cylinder or valve rod. In one embodiment of such flow regulating valves, said cylinder is fitted movably within a body to act as a check valve, and in another embodiment, the check valve is provided within said valve rod. The apparatus for feeding fluid for a predetermined time interval, comprises a housing having a valve chambers and a piston chambers disposed lengthwise and adjacent to each other, said valve chamber having a fluid inlet port on one end and a fluid outlet port on the other end, said fluid outlet port having a valve seat inside thereof; a valve movably fitted within said valve chamber and adapted to form a suitable gap between the inside surface of said valve chamber; a piston slidably fitted within said piston chamber, said valve and piston being connected together with a connecting rod; and a flow regulating valve provided on the outer end of said piston chamber, said flow regulating valve having a cylinder and a valve rod fitted telescopically therein, a flow passage of small sectional area being formed therebetween, so as to control discharge flow of the fluid in said piston chamber when being pushed by said piston, by adjusting the depth of the fitting of said valve rod within said cylinder, and further comprising a check valve on said cylinder or valve rod to permit rapid flow of the fluid into said piston chamber, an outlet port of controlled flow in said flow regulating valve and said inlet port of valve chamber being adapted to communicate with a fluid supplying source alternately through a change valve; and adapted to discharge a fluid introduced within said valve chamber by passing through said gap and from said outlet port, while said valve being forced by said fluid and moving to engage with said valve seat with a speed adjusted by controlling the flow of the fluid in said piston chamber by means of said flow regulating valve.

BRIEF DESCRIPTION OF THE DRAWINGS

FIG. 1 is a cross-sectional view of a fluid feeding apparatus according to the present invention;

FIG. 2 is a schematic view showing one example of the use of the apparatus shown in FIG. 1;

FIG. 3 is a fragmental enlarged cross-sectional view of another embodiment of the apparatus according to the present invention;

FIG. 4 is a schematic view of the apparatus showing another example of connection of the fluid supplying source.

DESCRIPTION OF THE PREFERRED EMBODIMENT

As seen in FIG. 1, an apparatus for feeding a compressed air for a predetermined time interval includes a housing 1 which has a valve chamber 2 and a piston chamber 8 disposed lengthwise and separated by a partition wall 3'. The valve chamber 2 has an air inlet port 4 on one end and an air outlet port 5 on the other end through the partition wall 3'. A valve seat 3 is provided on the partition wall 3'.

A valve 6 is fitted movably within the valve chamber 2. A suitable gap "a" is formed between the valve 6 and the inside surface of the valve chamber 2. The gap "a" may be formed as by providing grooves on the outside surface of the valve 6 or inside surface of the valve chamber 2, or by providing small holes about the periphery of the valve 6. A piston 7 is fitted slidably within the piston chamber 8, and the valve 6 is connected to the piston 7 with a connecting rod 9 penetrating through a hole provided in the partition wall 3'.

A body of the flow regulating valve 10 is secured on the outer end of the piston chamber 8. The body 10 includes a hole "A" on an inner end thereof and a cylinder 11 is fitted movably within the hole "A" and forced to press its shoulder 11a on to shoulder 10a of the body 10 through a packing 14 laid therebetween, by means of a spring 13 retained in a retainer 12.

A valve rod 15 is fitted telescopically within a bore 25 of the cylinder 11. A helical groove or grooves 16 is formed about the fitting area of the valve rod 15 and the outer end of the rod penetrates a plug 17 of the housing 1 as 18 and is fitted therein by a screw engagement, and a knob 19 is attached to the extended end thereof. Bore 25 communicates with the hole "A" through ports 20 provided at the suitable position of the cylinder 11, and opens to the piston chamber 8 through an opening 12a of the spring retainer 12, and the hole "A" of the regulating valve body 10 communicates with an opening 21 provided in the wall of the housing 1. The opening 21 and air inlet port 4 are adapted to communicate with a compressed air source 23 and atmosphere 24 alternately through a fourway change valve 22.

The apparatus functions as follows:

In the case of the valve 22 taking the position as shown in FIG. 1, the inlet port 4 is open to the atmosphere, and the compressed air of the source 23 is introduced into the hole "A" through the valve 22 and opening 21, and opens the contact of the shoulders 10a and 11a, by pushing the cylinder 11 against the spring 13, and flows into piston chamber 8 freely. As a result the piston 7 is forced to return rapidly to the return position together with the valve 6. Then, by connecting the air source 23 to the air inlet port 4 by turning the change valve 22, hole "A" of the flow regulating valve 10 becomes open to the atmosphere 24. In the meantime, air introduced in the valve chamber 2 forces the valve 6 and piston 7 to move to the right, removing the air in the piston chamber 8 through the flow regulating valve 10 and discharging to the atmosphere 24 through the change valve 22. However in this case, the shoulder 11a is kept contacted with shoulder 10a, so that the air in the piston chamber 8 is removed through the bore 25, helical groove 16 of the valve rod 15, and the ports 20 to the atmosphere. Therefore, in case the valve rod 15 is moved to the left by turning the knob 19, moving speed of the valve 6 and piston 7 may be reduced because the discharge rate of the air in the piston chamber 8 is reduced due to increase of the length of the groove 16 within the cylinder 11, and in case the valve rod 15 is moved to the right, piston speed is increased because of the decrease of the flow resistance of the groove 16. Thus the piston speed can be adjusted by controlling the flow of the fluid by adjusting depth of the fitting of the valve rod 15 within the cylinder 11. And the regulating valve 10 can adjust the flow rate accurately over a wide range, for example, by using a cylinder and a valve rod of suitably larger diameter.

Accordingly, while the valve 6 is moving to the right and pressed on to the valve seat 3, the compressed air which has passed through the gap "a", is discharged from the outlet port 5 for a predetermined time interval, and this air may be used, as for instance, for cleaning machined products or other purposes. FIG. 2 shows one example of the above-mentioned apparatus used for the quick releasing of vacuum chucks. In this case, the compressed air source 23 is connected to the inlet port 4 and the opening 21 of the air feeding apparatus 1 alternately through a 2-way change valve 22', and one branch of the pipe 26 which connects the opening 21 to the change valve 22' is connected to an inlet port of an air ejector pump 27. Suction port 28 of the pump 27 is connected to a suction pad 29 by a pipe 30 and the outlet port 5 of the air feeding apparatus 1 is connected to the pipe 30. In the case of the change valve 22' taking the position shown in FIG. 2, compressed air in the source 23 is sent to the inlet port of the ejector pump 27, and the air in the suction pad 29 is sucked out through the port 28, so that the pad 29 sticks to the article "B", and can carry the same. In the meantime, the compressed air is also sent to the air feeding apparatus 1 through the opening 21 and the valve 6 and piston 7 (FIG. 1) are forced to move to the return position. After the carrying operation of the article "B" is finished, the compressed air source 23 is brought into communication with the inlet port 4 by turning the change valve 22', then, the ejector pump 27 is stopped, and the compressed air is sent to the suction pad 29 through the outlet port 5 for a predetermined time interval and can release the article "B" rapidly. In this case, the air from the opening 21 is discharged to the atmosphere through the ejector pump 27.

FIG. 3 shows another embodiment of the flow regulating valve of the present invention, in which the cylinder 11 is secured to the outer end of the piston chamber 8 directly, and the valve rod 15 having helical groove 16 on the outside surface thereof is fitted telescopically within the cylinder 11, and a check valve 31 is provided within a hole formed at the inner end of the valve rod 15. The check valve 31 is forced to press on the bottom of the hole by means of a spring 33 provided between the check valve 31 and a stopper 32. 31' is a packing attached to the head of the check valve 31. A compressed air flow which was sent through opening 21, and a gap 34 between the cylinder 11 and rod 15, and ports 35, 36, opens the check valve 31 and flows into the piston chamber 8 freely through ports 37, 38 of the check valve, and a port 39 of the stopper 32, and moves the piston to the return position. In case of being pressed by the piston, air in the piston chamber 8 is discharged through the bore 25 of the cylinder 11, helical groove 16 of the valve rod 15 and the opening 21, and the discharge rate can be adjusted, by adjusting the depth of the fitting of the valve rod 15 in the similar way as mentioned above.

FIG. 4 shows other method of feeding compressed air to move the piston to the return position. In the figure, the compressed air source 23 is connected to the opening 21 through a reducing valve 40, and adapted to always supply compressed air to the opening 21 at a lower pressure than that applied to the inlet port 4.

As mentioned above, the flow regulating valve of the present invention can control the flow of the fluid very easily and accurately over a wider range than in the conventional needle valve regulator, and by providing a check valve on the cylinder or valve rod, a flow regulating valve capable of controlling the flow of one direction and to permit rapid flow of the opposite direction may be constructed in a compact form and is very easy to manufacture. Further, a fluid feeding apparatus utilizing such a flow regulating valve can be used for many purposes effectively.

The vacuum chuck device described previously using such fluid feeding apparatus can remove the negative pressure remaining within the suction pad by feeding pressurized air thereinto, when the suction is stopped, so that the device can release an article rapidly even if the conducting pipe is long and exhibits high flow resistance. Thus a quick acting chuck device may be obtained together with the use of the check value which will promote quick return of the valve in the valve chamber. Further, by adjusting the flow regulating valve, a sufficient amount but only a necessary amount of air can be fed into the suction pad when the suction is stopped, so that leakage of excess pressurized air from the suction pad, which may injure the work environment, may be prevent.

What is claimed is:

1. An apparatus for feeding fluid for a predetermined time interval comprising; a housing having a valve chamber and a piston chamber disposed lengthwise and adjacent to each other, said valve chamber having a fluid inlet port on one end and a fluid outlet port on the other end, said fluid outlet port having a valve seat inside thereof; a valve movably fitted within said valve chamber and dimensioned to form a suitable gap between it and the inside surface of said valve chamber; a piston slidably fitted within said piston chamber; a connecting rod, said valve and piston being connected together with said connecting rod; and a flow regulating valve provided on the outer end of said piston chamber, said flow regulating valve having a cylinder and a valve rod fitted telescopically within said cylinder and a flow passage of small sectional area being formed between said cylinder and valve rod so as to control discharge flow of the fluid in said piston chamber when being pushed by said piston, by adjusting the depth of the fitting of said valve rod within said cylinder, and further comprising a check valve on said cylinder or valve rod to permit a rapid flow of the fluid into said piston chamber; a flow path change valve; and fluid conduits for alternately connecting an outlet port of said flow regulating valve and said inlet port of said valve chamber to communicate with a fluid supplying source through said change valve, wherein a fluid introduced from the source into said valve chamber through said inlet port is discharged by passing through said gap and from said outlet port while said valve is being forced by said fluid from the source and moving to engage with said valve seat with a speed adjusted by controlling the flow of the fluid in said piston chamber by means of said valve rod of said flow regulating valve until said valve engages said valve seat, and wherein fluid introduced from the source into said flow regulating valve outlet port flows rapidly through said check valve and forces said piston to move toward said valve chamber and to rapidly move said valve off said valve seat to create a suction at said valve chamber outlet port and to expell the fluid within said valve chamber through said valve chamber inlet port.

2. An apparatus for feeding fluid for a predetermined time interval comprising; a housing having a valve chamber and a piston chamber disposed lengthwise and adjacent to each other, said valve chamber having a fluid inlet port on one end and a fluid outlet port on the other end, said fluid outlet port having a valve seat inside thereof; a valve movably fitted within said valve chamber and dimensioned to form a suitable gap between it and the inside surface of said valve chamber; a piston slidably fitted within said piston chamber; a connecting rod, said valve and piston being connected together with said connecting rod; and a flow regulating valve having one flow direction for rapid flow and another flow direction for control flow provided on the outer end of said piston chamber to control discharge flow of fluid in said piston chamber when the fluid is being pushed by said piston; a flow path change valve; and fluid conduits for alternately connecting an outlet port of said flow regulating valve and said inlet port of said valve chamber to communicate with a fluid supplying source through said change valve, wherein a fluid introduced from the source into said valve chamber through said inlet port is discharged by passing through said gap and from said outlet port while said valve is being forced by said fluid from the source and moving to engage with said valve seat with a speed adjusted by controlling the flow of the fluid in said piston chamber by means of the fluid flowing through said flow regulating valve in said another flow direction until said valve engages said valve seat, and wherein fluid introduced from the source into said flow regulating valve outlet port flows rapidly through said one flow direction and forces said piston to move toward said valve chamber and to rapidly move said valve off said valve seat to create a suction at said valve chamber outlet port and to expell fluid within said valve chamber through said valve chamber inlet port.

3. An apparatus according to claim 2, wherein said flow regulating valve is comprised of a cylinder and a valve rod extending telescopically within said cylinder, at least one of said cylinder and said valve rod having a helical surface groove defining a fluid flow passage of small cross section for permitting fluid flow control by adjusting a depth that said valve rod extends into said cylinder.

4. An apparatus according to claim 2, further comprising a check valve connected between said flow regulating valve outlet port and said piston chamber for permitting rapid flow of fluid introduced under pressure into said flow regulating valve outlet port into said piston chamber and for limiting fluid flow from said piston chamber to a flow of fluid through and regulated by said flow regulating valve.

5. A vacuum chuck device, comprising:
(a) a vacuum chuck comprised of a suction pad, an air ejector pump having a suction port, and a conduit between said air ejector pump suction port and said suction pad for developing a suction;
(b) a fluid feeding mechanism comprising a housing having a valve chamber and a piston chamber disposed lengthwise and adjacent to each other, said valve chamber having a fluid inlet port at one end and a fluid outlet port at an opposite end and said fluid outlet port opening at a valve seat, a valve movably fitted within said valve chamber and dimensioned to form a suitable gap between it and the inside surface of said valve chamber, a piston slidably fitted within said piston chamber, a connecting rod connecting said valve and said piston so that movement of said piston in said piston chamber is effective to move said valve in said valve chamber, and a flow regulating valve having one flow direction for rapid flow and another flow direction for control flow provided on the outer end of said piston chamber to control discharge flow of fluid in said piston chamber when the fluid is being pushed by said piston, a flow path change valve, and fluid conduits for alternately connecting an outlet port of said flow regulating valve and said inlet port of said valve chamber to communicate with a fluid supplying source through said change valve, wherein a fluid introduced from the source into said valve chamber by passing through said gap and from said outlet port while said valve is being forced by said fluid from the source and moving to engage with said valve seat with a speed adjusted by controlling the flow of the fluid in said piston chamber by means of the fluid flowing through said flow regulating valve in said another flow direction until said valve engages said valve seat and wherein fluid introduced from the source into said flow regulating valve outlet port flows rapidly through said one flow direction and forces said piston to move toward said valve chamber and to rapidly move said valve off said valve seat to create a suction at said valve chamber outlet port and to expell fluid within said valve chamber through said valve chamber inlet port; and (c) means comprising fluid conduits connected between said vacuum chuck and said fluid feeding mechanism for operating said air ejector pump to develop a suction and simultanesouly move said valve in said valve chamber when compressed air is delivered to said flow regulating valve outlet port to flow through said regulating valve in said one direction has been inserted after "port" line 37 "compressed" and for supplying compressed air introduced into said valve chamber by passing through said gap from the valve chamber outlet port to said suction pad for rapidly releasing said suction pad while said valve is moved by the comprssed air toward said valve seat at said speed determined by the adjustment of said flow regulating valve to expell the control fluid in said regulating valve in said another flow direction while the compressed air is delivered to said valve chamber inlet port and operation of said air ejector pump is stopped.

6. A vacuum chuck device according to claim 5, wherein said flow regulating valve is comprised of a cylinder and a valve rod fitted telescopically within said cylinder, and a flow passage of small sectional area formed therebetween by providing at least one helical groove on said cylinder or valve rod, so as to be capable of controlling flow of the fluid by adjusting a depth of the fitting of said valve rod within said cylinder.

* * * * *